Patented June 30, 1925.

1,544,530

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

PROCESS OF MAKING CHLORINATED RUBBER AND PRODUCTS DERIVED THEREFROM.

No Drawing.    Application filed July 26, 1921. Serial No. 487,784.

*To all whom it may concern:*

Be it known that I, CARLETON ELLIS, a citizen of the United States, residing at Montclair, in the county of Essex and State of New Jersey, have invented certain new and useful Improvements in Processes of Making Chlorinated Rubber and Products Derived Therefrom, of which the following is a specification.

This invention relates to a process of chlorinating rubber and to the product thereof and products derived therefrom and relates especially to a method of chlorinating rubber by exposing solid rubber to the action of chlorine in the presence of a regulated amount of a solvent vehicle, said vehicle being a solvent for both the rubber and for the rubber chlorid.

Rubber is soluble with difficulty in solvents such as gasoline, benzol and the like and a comparatively small amount of rubber suffices when throughly dissolved to make a very viscous solution. Chlorinating such a solution involves considerable expense as regards evaporation of solvent etc. in order to produce a concentrated solution of chlorinated rubber or the solid material itself. In the present invention one phase of procedure is the treatment of a suspension of rubber in a solvent medium. For example by agitating fragments of rubber in a rubber solvent and passing chlorine therethrough the rubber will become chlorinated at the surface of the fragments and will dissolve in the solvent. While raw rubber dissolves very slowly in so-called rubber solvents, the chlorinated rubber is relatively soluble and dissolves easily and rapidly, as fast as formed. Therefore by agitating sheets or fragments of rubber in the presence of a suspensory vehicle preferably a volatile solvent and preferably a good solvent for chlorinated rubber, the raw rubber, will be softened at the surface by the action of the solvent and agitation, the solvent being saturated with chlorine will chlorinate the softened rubber at the surface of each fragment and the chlorinated rubber thus formed will promptly dissolve in the solvent.

With a given body of solvent or suspensory vehicle the entire batch of rubber to be chlorinated may be added at once or in portions. Vigorous agitation is desirable and as an object of the invention is to be able to obtain concentrated solutions of chlorinated rubber without the necessity of removing solvent by evaporation, it is desirable to have the agitating device sufficiently strong to handle highly viscous solutions of the resulting chlorinated rubber.

As a solvent I may use to advantage carbon tetrachloride as this is not affected by chlorine, I also may use benzol, toluol and similar hydrocarbons of the benzol type. Also chloroform, trichlorethylene and carbon bisulphide. Of course the latter is readily affected by chlorine and is only used in certain special occasions. Ordinary gasoline is chlorinated rather easily and while it may be used in its raw state it is advisable to chlorinate the original gasoline and distill to remove any tarry substances. Gasoline is a poor or imperfect solvent for chlorinated rubber and may be added in some cases to solvents which readily dissolve chlorinated rubber when it is desired to modify the degree of solubility of the suspensory vehicle during the chlorination process.

The chlorine employed may be liquid chlorine or chlorine from electrolyzing salt and containing more or less oxygen or air or hydrogen. Chlorine or a chlorine-containing gas may be used or even substances generating chlorine such as chloride of lime or bleaching powder. The use of the latter however involves too many complications so that ordinarily I confine myself to the use of a chlorine containing gas or a halogen containing gas, for instance to chlorine. A certain amount of bromine or iodine may be added or bromine gas or liquid bromine may be used by itself without any chlorine.

The liquid may be kept cool when it is desired to retain or produce a highly colloidal chlorinated rubber. On the other hand elevation of the temperature to somewhat above room temperature as for example to 40 or 50° C. may be employed for chlorinated rubber of good quality. Higher temperatures, for example nearly approaching the boiling point of carbon tetrachloride, may be used for more drastic chlorination. Exposure to sunlight or actinic light may be employed to assist the chlorination. By exposure to sunlight a considerable amount of substitution of chlorine will occur besides the addition of chlorine. Thus by allowing the temperature of the mass to grow warm through the heat of the reaction and by exposure to light it is possible to combine a large amount of chlorine with rubber. Products may be obtained containing more chlorine than rubber. Some of these products when dried out to thin films are hard and glossy but fairly brittle, substantially different from the colloidal flexible films obtained by a lower stage of chlorination and especially by chlorination only to the point of saturation. Chlorination beyond this point involving substitution of chlorine gives the more brittle products. While these are not so useful for films and the like they have desirable qualities for coating purposes, as for example varnishing wood or metal. The per-chlorinated rubber (as I choose to call rubber which has been chlorinated beyond a point where it takes up its own weight of chlorine) is not brittle like many of the resins, but possesses a certain toughness and flexibility even in the most highly chlorinated state, which makes it different in properties in many respects from resinous compounds.

A form of the chlorinated rubber which constitutes one of the products of the present invention is a chlorinated rubber sponge made by expelling the last portions of the solvent used for chlorination, by employing considerable heat. This causes the chlorinated rubber with its residue of solvent to swell to a spongy mass, which when thoroughly dry and free from solvent may be crushed between the fingers to a rather flaky product. Even when of a very spongy character the sponge offers a certain degree of resistance to crushing between the fingers indicative of a desirable quality of toughness not exhibited by resinous substances when in a highly vesiculated condition.

A sample of chlorinated rubber sponge made in carbon tetrachloride vehicle from crêpe rubber was almost snowy white in appearance and dissolved in solvents such as benzol, or carbon bisulphide with remarkable ease, almost as powdered sugar dissolves in water. As the quantity of this fluffy chlorinated rubber sponge is increased the solvent increases in viscosity until it becomes almost too thick to flow. The solution made from the chlorinated rubber aforesaid was very light in color.

An example of the method of treating rubber to produce a highly chlorinated rubber material is as follows:

Approximately 1350 parts by weight of carbon tetrachloride were placed in a tall glass cylinder equipped with an agitator. 25 parts of crêpe rubber were placed in the carbon tetrachloride and the agitator started. Without waiting for the rubber to dissolve, chlorine gas was passed into the solution. After about 1½ hours this quantity of rubber was practically all in solution and the reaction mixture had become quite warm. During this operation the apparatus was exposed to sunlight. Additional quantities of rubber were added from time to time and went into solution in like manner until approximately 80 grams of rubber had been added.

Samples of the liquid withdrawn from time to time were spread out in thin layers on glass and the rate of drying noted. The presence of any substantial amount of raw rubber in chlorinated rubber causes the film to dry quite slowly and with a certain degree of tackiness. The samples withdrawn in the present case dried quickly without tackiness indicating that chlorinated rubber, but not much, if any, raw rubber, was present in the solution. Hence chlorination under these conditions took place at the surface of the rubber at least to a very large extent and probably was responsible for the rapidity with which the rubber went into solution.

As the glass cylinder was not under pressure the hydrochloric acid produced and any excess chlorine together with the temperature of the solution brought about the evaporation of some of the carbon tetrachloride so that at the close of the reaction about one-half a liter of solution was obtained. This was thick, transparent and almost white in color, free from yellow tone. When a stirring rod was placed in this solution and lifted, drawing with it a sheet of the solution, on exposure to air the chlorinated rubber solidified almost instantly forming a skin over the sheet so lifted which could be almost immediately handled without tackiness although the chlorinated rubber inside the pellicle was still in a liquid condition. This solution was found to contain 32% of solids. The solid, that is the chlorinated rubber material, contained approximately 70% of chlorine in combination. In other words the rubber had taken up more than twice its weight of chlorine.

On evaporating some of the solution on a hot plate at a temperature slightly above that of the water bath a fluffy chlorinated rubber product was obtained. Care should be taken in heating the solution to make the fluffy chlorinated rubber not to discolor the product. The fluffy chlorinated rubber thus obtained was very attractive looking resembling masses of snow or cotton or similar light flocculent or fibrous material.

The rubber chlorinated to this extent is highly resistant to ignition and has the property of preventing the combustion of material such as paper, cloth, twine, rope, wood etc. when suitably impregnated in such fibrous substances.

A sheet of paper was impregnated and coated with a solution of the fluffy chlorinated rubber dissolved in carbon bisulphide. The paper had a glossy surface when a match was held to one corner of the sheet the impregnated paper did not burn although a sheet of untreated paper of similar nature burned very readily. In like manner twine and cloth may be impregnated to greatly reduce the combustibility and ease of ignition of such material. At the same time a waterproof effect is secured. The chlorinated rubber may be used as the basis of insulation, e. g. for coating wire or for impregnating cotton braided wire etc. to produce insulation which is not inflammable and does not propagate flame or ignition. This highly chlorinated or per-chlorinated rubber may likewise be admixed in suitable solution with fillers such as mica, asbestos, talc, clay, wood flour, saw dust, wool or other fibrous material and molded into masses suitable for insulation and other purposes.

While it is possible by the process described above to make chlorinated rubber in colloidal form such products containing 23 to 33% of combined chlorine or less colloidal chlorinated rubbers such products containing say from 33 to 50% of combined chlorine, in the present invention I have particularly in mind producing per-chlorinated rubber, such product containing 50% and upwards of combined chlorine and preferably containing more than 67% of chlorine for fire-proofing and waterproofing purposes and also as insulating material where non-inflammability is important. The process above described of using a solvent vehicle merely as a means for suspending chunks of rubber in order to chlorinate or halogenate these and produce a useful solution of chlorinated rubber is however applicable to the production of chlorinated rubbers containing percentages of chlorine up to 50% chlorine, as well as for making the chlorinated rubbers of higher percentage.

It is desirable to remove from the solution any hydrochloric acid formed by substitution and this acid when produced in quantity may be absorbed in water and recovered as aqueous hydrochloric acid; from the final solution of chlorinated rubber traces of acid may be removed by washing or by treatment with ammonia gas etc. In one case a concentrated solution of chlorinated rubber and carbon bisulphide when treated with ammonia gas gave an opaque solution somewhat resembling fish glue solutions.

When rubber is chlorinated to a small extent only, and formed into films or threads, and when a flame is brought in contact with these, the films shrivel and while not burning in the ordinary sense of the word appear in some cases to undergo a peculiar kind of rather rapid decomposition or quasi-combustion which propagates along the film or thread for a considerable distance. With per-chlorinated rubber this is not nearly so apparent and in fact the material while breaking down when subjected to a high temperature does not do so in a manner akin in any sense to combustion.

In the foregoing I have referred to crêpe rubber in the illustrative example but it should be understood that rubbers of different characteristics and origin including crude rubbers such as those containing resin and refined rubbers of various grades may be employed. De-resinated rubber may be similarly treated by the process aforesaid. Chicle, balata, gutta percha and the like also may be chlorinated in mass in the presence of a suspensory vehicle. In the appended claims, the term "rubber" is accordingly employed as including the use of such equivalent material. In the foregoing illustration, certain proportions of rubber to solvent were specified but it should be understood that these proportions may be varied considerably especially in the direction of increasing the proportion of rubber. In this way more compact apparatus may be employed and a saving in the amount of solvent etc. secured. The less solvent used the more desirable it is to have the agitator powerful so that thorough agitation or kneading may be secured with the plastic material undergoing chlorination.

To the solutions of chlorinated rubber thus obtained various other substances may be added such for example as various natural or synthetic resins, waxes, chlornaphthalene in liquid or solid form, vegetable oils or oils which have been treated with sulphur chloride, blown oils and the like.

What I claim is:—

1. The process of treating rubber with chlorine to produce chlorinated rubber which comprises placing solid unvulcanized rubber in a liquid which is a good solvent both for unchlorinated unvulcanized rubber and for chlorinated rubber, the amount of said liquid being a minor fraction only of the amount which would be necessary to readily dissolve said rubber, introducing chlorine gas and agitating, whereby a concentrated solution of chlorinated rubber is directly formed.

2. The process of making chlorinated rubber which comprises reacting with chlorine on fragments of undissolved unvulcanized rubber suspended in a volatile medium in which chlorinated rubber is soluble.

3. The process of making chlorinated rubber which comprises reacting on fragments of unvulcanized rubber with chlorine, and dissolving away the chlorinated rubber from said fragments as fast as formed, said fragments being of appreciable size.

4. A process which comprises treating undissolved vulcanized rubber with free chlorin, until a product containing, in stable condition, more than 67% of chlorin is produced.

5. The process of making chlorinated rubber which comprises agitating fragments of unvulcanized rubber suspended in a volatile solvent vehicle in the presence of chlorine and in continuing the treatment until the rubber has combined with at least an equal weight of chlorine.

6. The process of making chlorinated rubber which comprises reacting on unvulcanized rubber in a suspensory vehicle with chlorine until substantially over two parts by weight of chlorine has combined with one part by weight of rubber.

7. As a new product of manufacture chlorinated rubber containing substantially above 67% of combined chlorine.

8. A process which comprises treating undissolved unvulcanized rubber with free chlorin until a product containing, in stable condition, not substantially less than 70% of chlorin is produced.

9. As a new article of manufacture chlorinated rubber in the form of a sponge-like structure.

10. A sponge-like structure consisting essentially of chlorinated rubber containing over 67% of combined chlorin.

11. As a new product of manufacture, chlorinated rubber containing over 70% of combined chlorine.

12. A spongy, fluffy product consisting of chlorinated rubber containing more than 67% of combined chlorine including both chlorine of addition and chlorine of substitution.

CARLETON ELLIS.